(12) United States Patent
Jung (10) Patent No.: US 11,234,455 B2
(45) Date of Patent: Feb. 1, 2022

(54) DEVICE FOR PRESERVABILITY ENHANCEMENT BASED ON CELLULAR WATER ACTIVATION

(71) Applicant: HANBIT E&B, Seoul (KR)

(72) Inventor: Sang-won Jung, Dong-gu (KR)

(73) Assignee: HANBIT E&B, Seoul (KR)

( * ) Notice: Subject to any disclaimer, the term of this patent is extended or adjusted under 35 U.S.C. 154(b) by 231 days.

(21) Appl. No.: 16/093,441

(22) PCT Filed: Apr. 19, 2016

(86) PCT No.: PCT/KR2016/004070
§ 371 (c)(1),
(2) Date: Jul. 29, 2019

(87) PCT Pub. No.: WO2017/179752
PCT Pub. Date: Oct. 19, 2017

(65) Prior Publication Data
US 2019/0364933 A1   Dec. 5, 2019

(30) Foreign Application Priority Data

Apr. 14, 2016 (KR) .................. 10-2016-0045627

(51) Int. Cl.
*A23L 3/26* (2006.01)
*A23L 5/30* (2016.01)
*A23L 3/32* (2006.01)

(52) U.S. Cl.
CPC *A23L 3/26* (2013.01); *A23L 3/32* (2013.01); *A23L 5/30* (2016.08)

(58) Field of Classification Search
CPC ....................................................... A23L 3/26

USPC .................... 99/451; 204/194; 219/600, 764; 250/461.1; 327/530

See application file for complete search history.

(56) References Cited

U.S. PATENT DOCUMENTS

2008/0074110 A1   3/2008  Mito et al.

FOREIGN PATENT DOCUMENTS

| KR | 10-2008-0048817 A | 6/2008 |
|---|---|---|
| KR | 10-2009-0011455 A | 2/2009 |
| KR | 10-1439196 B1 | 9/2014 |
| KR | 10-2015-0119630 A | 10/2015 |
| KR | 20-2015-0003911 | 10/2015 |
| KR | 20150003912 U | 10/2015 |
| KR | 101728803 B1 | 5/2017 |

*Primary Examiner* — Lori L Baker
(74) *Attorney, Agent, or Firm* — Maschoff Brennan

(57) ABSTRACT

Disclosed is a device for preservability enhancement including: a primary energy wave generation unit which generates, by receiving AC 220V power from a 220V power input unit via a noise filter, an electromagnetic field by an inner electric coil, generates a preconfigured frequency in which a generated electric field and electromagnetic field energy are included, and generates free electrons by the flow of an electric current therein resulting from the electromagnetic field; and a tertiary complex wave generation and amplification unit which receives, via an output terminal of the primary energy wave generation unit, the free electrons and the electromagnetic field having information of the primary energy wave generation unit and generated thereby and, by using the free electrons and the electromagnetic field thus received, combines, amplifies and emits the first cell-activating energy wave.

4 Claims, 13 Drawing Sheets

Experiment on water culture of onion - 40 days later (a) With device    (b) Without device

Experiment on cohesion of egg yolk of raw egg

[FIG.7]

Experiment on germination

(b) Without device      (a) With device (b) Without device      (a) With device

[FIG. 8]

Experiment on long-term storage of soft tofu (a) 30 months past expiry date    (b) 19 months past expiry date

[FIG. 9]

Experiment on long-term storage of milk (a) 23 months past expiry date  (b) 32 months past expiry date

[FIG. 10]

Experiment on long-term storage of dairy products (a) 20 months past expiry date
(b) 29 months past expiry date
22 months past expiry date
17 months past expiry date

[FIG 11]

Oriental orchid grown for three years in water treated by device

[FIG. 12]

Culture of bean sprouts

Water culture of garlic

[FIG. 13]

Water culture of potato

Water culture of sweet potato

[FIG. 14]

Culture of peppers with water treated by device

DEVICE FOR PRESERVABILITY ENHANCEMENT BASED ON CELLULAR WATER ACTIVATION

TECHNICAL FIELD

The present invention relates to a device for preservability enhancement based on cellular water activation and more specifically, to a device for preservability enhancement based on cellular water activation, which continuously activates water in the cells of food, and agricultural, marine and animal products in room-temperature and low-temperature storage environments, so as to improve preservability.

RELATED ART

At a time when the retail and export of food or agricultural produce have grown, various methods for keeping and storing them have been developed. It is known that a seed whose cells are alive can be stored for a long period and can be preserved in good condition when the cells are activated.

South Korean Patent No. 10-1439196 titled "Food storage system and apparatus" filed by this applicant provides free electrons and an electromagnetic field to a preconfigured frequency and provides micro electric and magnetic energy to food so as to suppress the generation of saturated fatty acids in food and maintain the state where energy is activated.

Further, this applicant has devised a method of generating, combining and amplifying specific frequency waves so as to emit the same as specific electric and magnetic fields such that water in the cells of food, or agricultural, marine and animal products can be continuously activated by useful energy waves, thereby making it possible to keep food, or agricultural, marine and animal products fresh for a long period of time, considering that all substances have their own energy waves.

PRIOR ART DOCUMENT

Patent Document (Patent Document 1) South Korean Patent No. 10-1439196 titled "Food storage system and apparatus"
(Patent Document 2) South Korean Patent Publication No. 10-2015-0119630 titled "Cell activation assisting method for home refrigerator"

DETAILED DESCRIPTION OF THE INVENTION

Technical Problems

As a means to solve the above-described problems, the present invention is directed to providing a device that is capable of enhancing preservability and freshness by generating, amplifying and delivering a cell-activating complex frequency wave such that useful low frequencies activate water in the cells of food.

Additionally, the present invention is directed to providing a device for preservability enhancement based on cellular water activation, which enables the unique flavor of food to be restored, delays decomposition and enables freshness of food to be maintained for a long time, by combining useful low frequencies and activating frequencies generated via three types of frequency generators, putting the same on amplified energy waves, and emitting the same via a delivery device.

However, the purposes of the present invention are not limited to the ones that have been described above. Additionally, other purposes that have not been described will be clearly understandable to one skilled in the art to which the present invention pertains, form the following description.

Technical Solutions

As a means to achieve the above-described purposes, a device for preservability enhancement based on cellular water activation of the present invention includes a primary energy wave generation unit 110, a secondary energy wave generation unit 130, and a tertiary complex wave generation and amplification unit 120, wherein the primary energy wave generation unit 110 generates, by receiving AC 220 V power from a 220 V power input unit 1a via a noise filter 2, generates an electromagnetic field by means of an electric coil therein, generates a preconfigured frequency (first cell-activating energy wave) in which a generated electric field and electromagnetic field energy are included, and generates free electrons by means of the flow of an electric current therein resulting from the electromagnetic field; and the tertiary complex wave generation and amplification unit 120 receives, via an output terminal of the primary energy wave generation unit 110, free electrons and an electromagnetic field, having an energy wave of the primary energy wave generation unit 110 and generated by the primary energy wave generation unit 110, and combines, amplifies and emits the first cell-activating energy wave by using the received free electrons and electromagnetic field.

In this case, when the tertiary complex wave generation and amplification unit 120 receives the flow of free electrons from the primary energy wave generation unit 110, the tertiary complex wave generation and amplification unit 120 receives DC V power according to the conversion of AC 220 V power output by a 220 V power output unit 1b into DC 12 V by an AC-DC converter 3.

Further, the tertiary complex wave generation and amplification unit 120 delivers a first cell-activating energy wave received from the primary energy wave generation unit 110 to an A low frequency wave generation unit 121, a B low frequency wave generation unit 122, and a C low frequency wave generation unit 123 respectively.

Further, the tertiary complex wave generation and amplification unit 120 delivers a first cell-activating energy wave received from the primary energy wave generation unit 110 to the A low frequency wave generation unit 121, the B low frequency wave generation unit 122, the C low frequency wave generation unit 123, and a secondary energy wave induction unit 127 respectively.

Additionally, the A low frequency wave generation unit 121 generates an A low frequency wave among specific A to C low frequency waves so as to synchronize, activate and improve a unique energy wave in one or more among food, and agricultural, marine and animal products by means of the first cell-activating energy wave.

Further, the B low frequency wave generation unit 122 generates a B low frequency wave among A to C low frequency waves by using the first cell-activating energy wave, and the C low frequency wave generation unit 123 generates a C low frequency wave among A to C low frequency waves by using the first cell-activating energy wave.

Further, the secondary energy wave induction unit 127 that activates a second cell-activating energy wave generates electromagnetism in various functional liquid substances so as to generate useful low frequency energy waves.

Advantageous Effects

A device for preservability enhancement based on cellular water activation according to an embodiment of the present invention has the advantages of enabling the unique flavor of food to be restored, delaying decomposition and enabling freshness to be maintained for a long time, by combining useful low frequencies extracted from various substances and specific frequencies generated via three types of frequency generators, putting the same on an amplified signal, and emitting the same via a delivery device, through the generation, amplification and delivery of cell-activating complex frequency waves.

MODE FOR CARRYING OUT THE INVENTION

The preferred embodiments of the present invention will be described in detail with reference to the attached drawings. In describing the present invention, detailed description of the known functions and configurations will be omitted if it is deemed to make the gist of the present invention unnecessarily vague.

Figure 1:
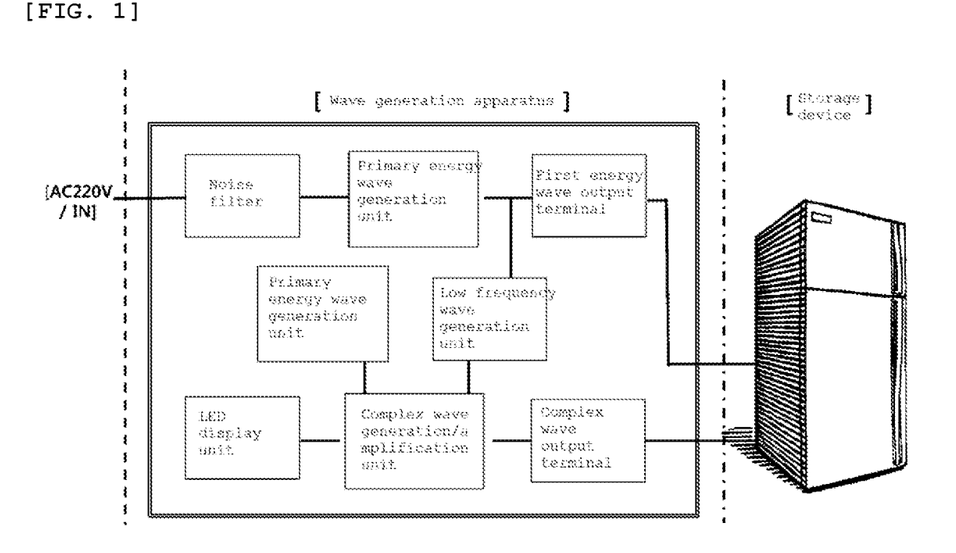
FIGS. 1 and 2 illustrate a configuration of a device for preservability enhancement based on cellular water activation according to an embodiment of the present invention.
Figure 2:
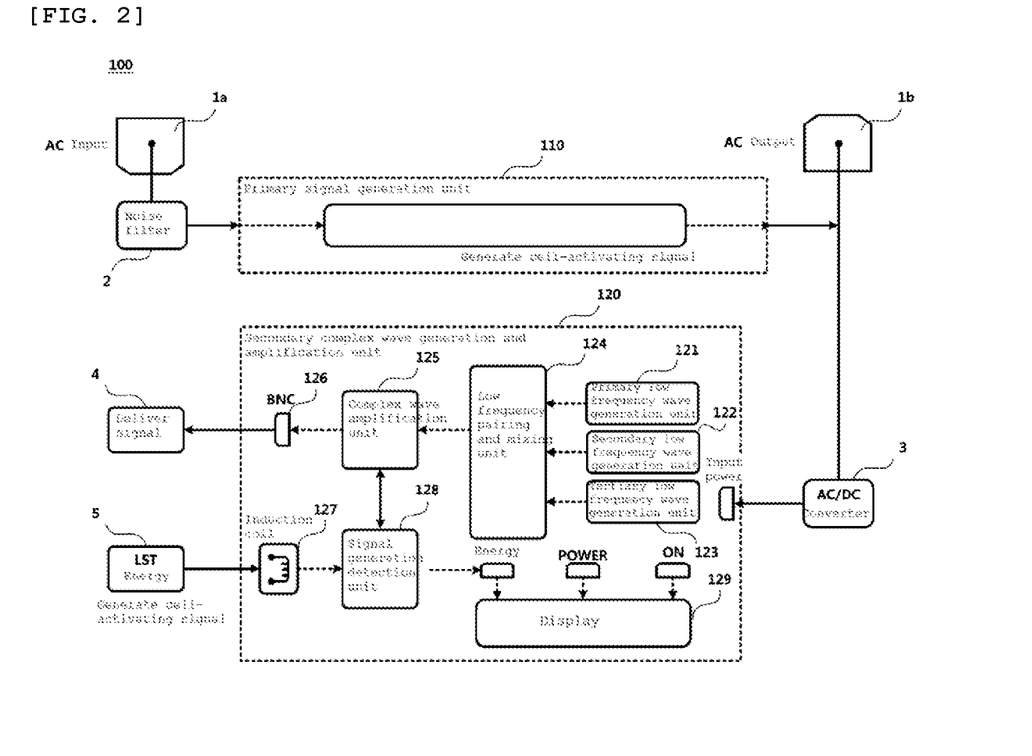

FIGS. 1 and 2 illustrate a configuration of a device for preservability enhancement based on cellular water activation 100 according to an embodiment of the present invention.

First, with reference to FIG. 1, a device for preservability enhancement based on cellular water activation 100 includes a primary energy wave generation unit 110, a secondary energy wave generation unit 130, and a tertiary complex wave generation and amplification unit 120.

Herein, the primary energy wave generation unit 110 generates, by receiving AC 220 V power from a 220 V power input unit 1a via a noise filter 2, an electromagnetic field by means of an electric coil therein. The primary energy wave generation unit 110 generates a preconfigured frequency in which an electric field generated from a rare earth element that is a solid etc. and an electromagnetic field energy are included, and generates free electrons by means of the flow of an electric current therein resulting from the electromagnetic field.

Accordingly, the primary energy wave generation unit 110 delivers the generated preconfigured frequency energy wave ("first cell-activating energy wave") to the tertiary complex wave generation and amplification unit 120.

More specifically, the free electrons and electromagnetic field generated by the primary energy wave generation unit 110 have an energy wave of the primary energy wave generation unit 110, and the tertiary complex wave generation and amplification unit 120 combines, amplifies and emits the first cell-activating energy wave which is supplied via an output terminal of the primary energy wave generation unit 110 by using received free electrons and a received electromagnetic field.

The tertiary complex wave generation and amplification unit 120 receives the flow of free electrons and a first cell-activating signal inside the primary energy wave generation unit 110. When the tertiary complex wave generation and amplification unit 120 receives the flow of free electrons, the tertiary complex wave generation and amplification unit 120 receives DC 12 V power according to the conversion of AC 220 V power output by a 220 V power output unit 1b into DC 12 V by an AC-DC converter 3. Preferably, the first cell-activating energy wave received from the primary energy wave generation unit 110 is delivered to an A low frequency wave generation unit 121, a B low frequency wave generation unit 122, and a C low frequency wave generation unit 123.

Thus, the A low frequency wave generation unit 121 generates an A low frequency wave among A to C low frequency waves that are preconfigured and specified in advance with respect to the first cell-activating energy wave.

In the same way, the B low frequency wave generation unit 122 generates a B low frequency wave among A to C low frequency waves by using the first cell-activating energy wave.

In the same way, the C low frequency wave generation unit 123 generates a C low frequency wave among A to C low frequency waves by using the first cell-activating energy wave.

Preferably, the A, B and C low frequency waves respectively range from 1.5 to 4.0 Hz, 6.5 to 9 Hz, and 500 to 560 Hz.

Then a low frequency pairing mixing unit 124 mixes A to C low frequency waves so as to generate a cell-activating complex frequency wave and deliver the same to a complex wave amplification unit 125.

Meanwhile, a secondary energy wave induction unit 127 of the tertiary complex wave generation and amplification unit 120 supplies a low frequency energy wave (second cell-activating energy wave) generated by a secondary energy wave generation unit 5 to an energy wave generation detection unit 128. Herein, the low frequency energy wave ranges preferably from 0.1 Hz to 880 Hz.

To this end, when preconfigured ingredients are extracted, and a weak energy wave generated in a mixed and liquefied functional solution is excited through a bobbin, the secondary energy wave induction unit 127 generates an electromagnetic field with respect to the excited bobbin, generates a preconfigured frequency (second cell-activating energy wave) containing an energy wave and an electromagnetic field, and delivers the generated second cell-activating energy wave to the energy wave generation detection unit 128.

Herein, the mixed and liquefied functional solution is used to extract useful low frequencies by mean of the liquefaction of various substances. According to an embodiment of the present invention, a solution where acetic acid, hydrogen peroxide, various minerals are mixed can be used as a mixed and liquefied functional solution. The mixed and liquefied functional solution is stored in a container for mixed liquid, and the tertiary complex wave generation and amplification unit 120 including the secondary energy wave induction unit 127 generates a second cell-activating energy wave by means of the secondary energy wave induction unit 127 using a wave generated from the mixed and liquefied functional solution.

Accordingly, the energy wave generation detection unit 128 supplies the second cell-activating energy wave to the complex wave amplification unit 125, and the complex wave amplification unit 125 generates a second cell-activating energy wave with a preconfigured cell-activating complex frequency wave generated by the low frequency pairing mixing unit 124 and then combines the first cell-activating energy wave and/or the second cell-activating energy wave generated through the cell-activating complex frequency wave so as to amplify the same and afterwards delivers energy through an energy delivery unit 4 connecting with a BNC connector 126.

Through the above-described configuration, a specific frequency is generated, combined, amplified so as to be emitted as micro electric and magnetic fields thereby making it possible to continuously activate water in food, restore the unique flavor of food, or agricultural and marine produce, lengthen the lifespan thereof, and maintain the freshness thereof.

Figure 3:
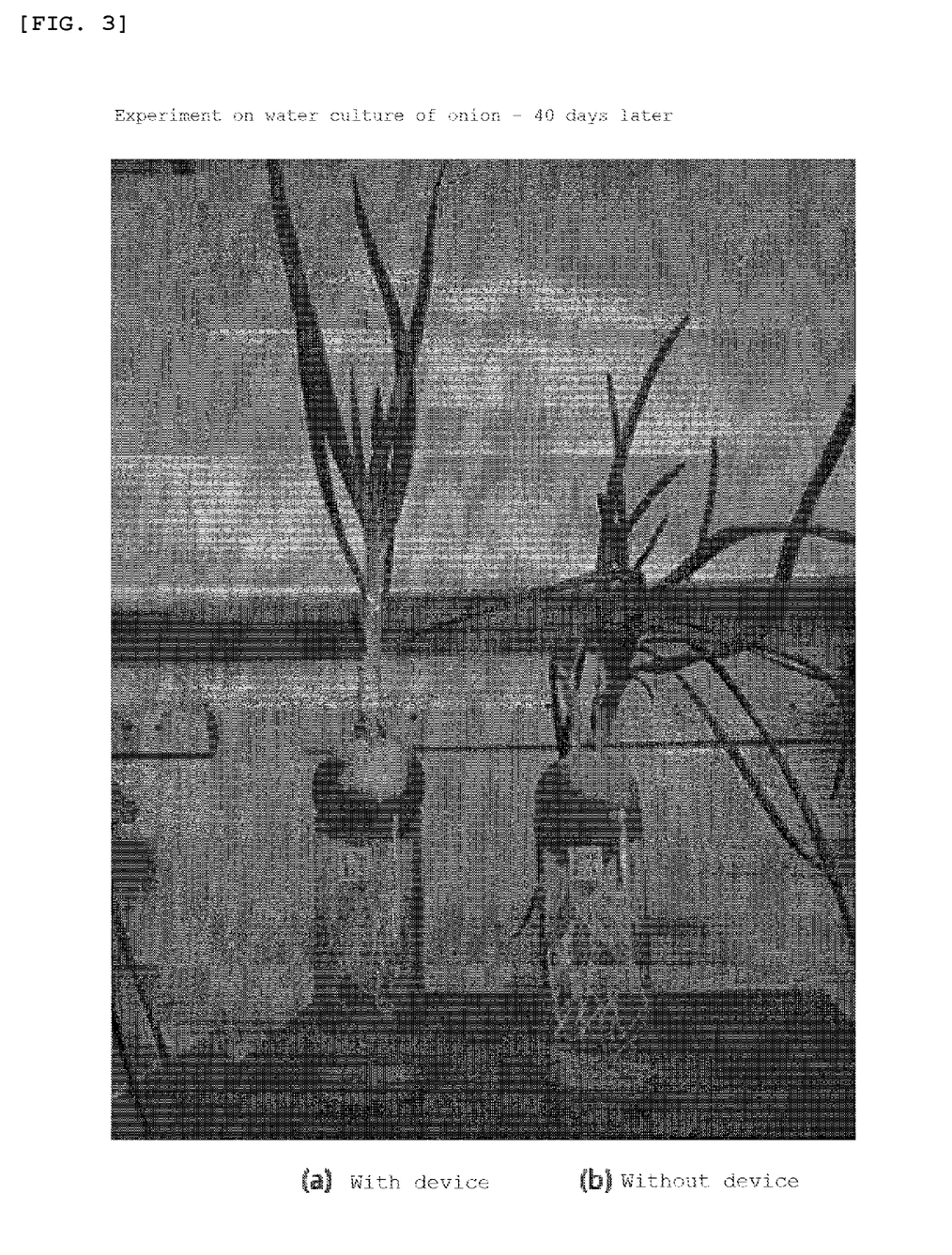
FIGS. 3 to 7 illustrate the effects of the device for preservability enhancement based on cellular water activation 100 in FIG. 1 through comparison.

FIG. 3(*a*) illustrates the state of the water culture of an onion by means of treated water having received a complex energy wave through an energy delivery unit 4 in a device for preservability enhancement based on cellular water activation 100 while FIG. 3(*b*) illustrates the state of the water culture of an onion without such treated water.

Figure 4:
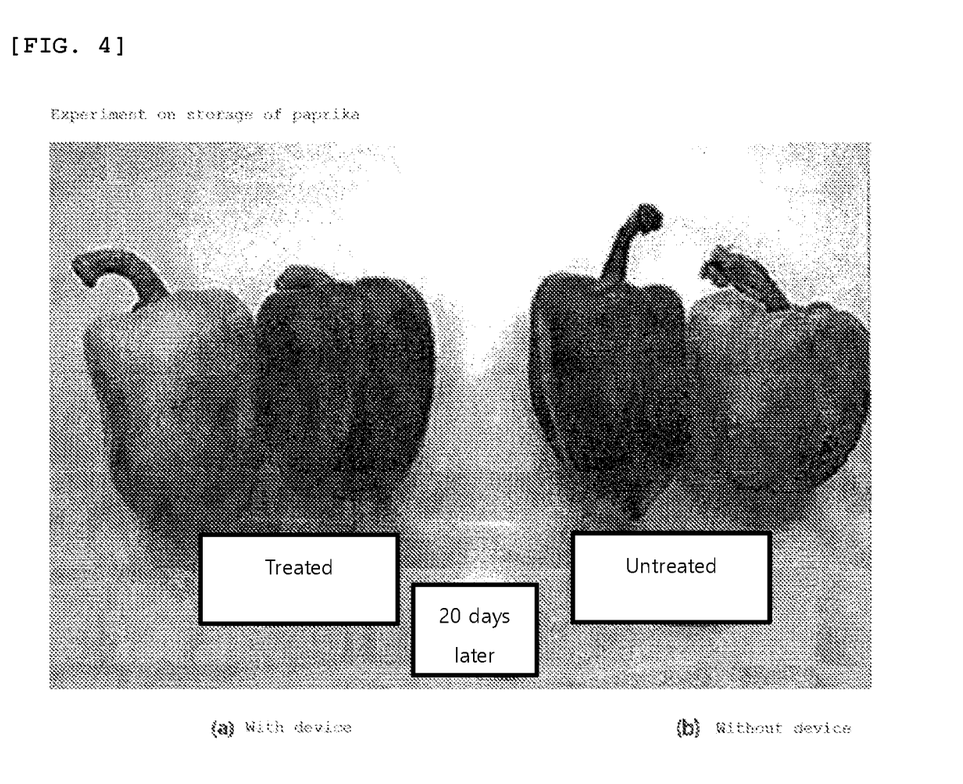

FIG. 4(*a*) illustrates the state where paprika having received a complex energy wave through an energy delivery unit 4 of a device for preservability enhancement based on cellular water activation 100 is stored while FIG. 4(*b*) illustrates the state where paprika having not received an energy wave through the energy delivery unit 4 of the device for preservability enhancement based on cellular water activation 100 is stored. The paprika in FIG. 4(*a*) looks much fresher than the paprika in FIG. 4(*b*) 20 days later.

Figure 5:
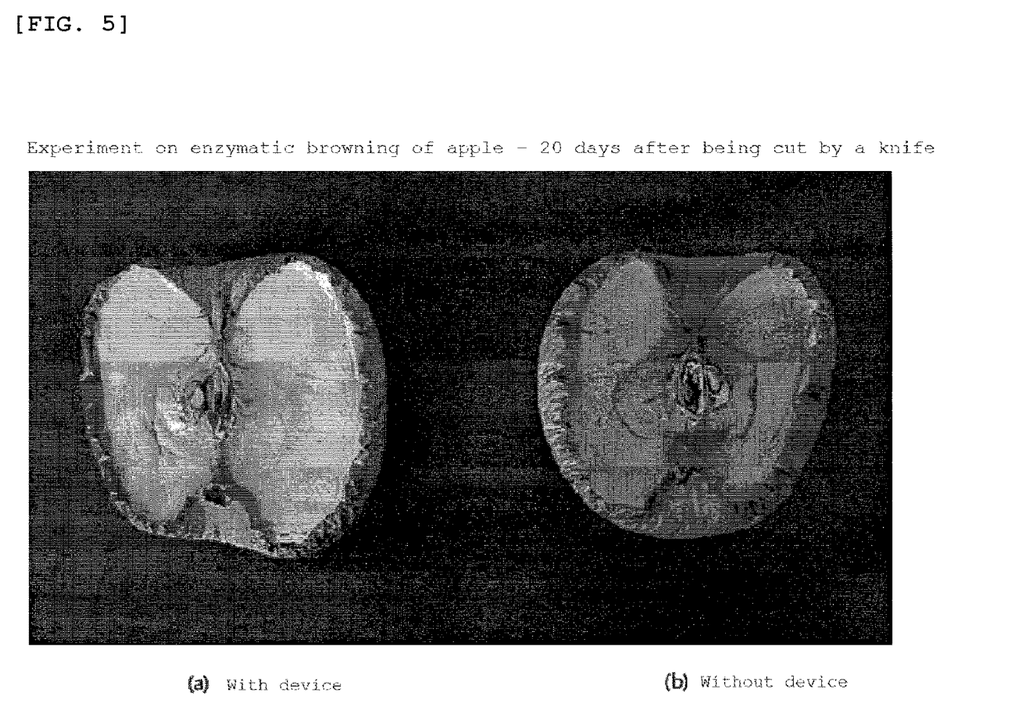

FIG. 5(*a*) illustrates the state where an apple in a storage device, having received a complex energy wave through an energy wave delivery unit 4 in a device for preservability enhancement based on cellular water activation 100, turns brown while FIG. 5(*b*) illustrates the state where an apple having not received an energy wave turns brown. The enzymatic browning of the apple in FIG. 5(*b*) proceeds further than that of the apple in FIG. 5(*a*).

Figure 6:
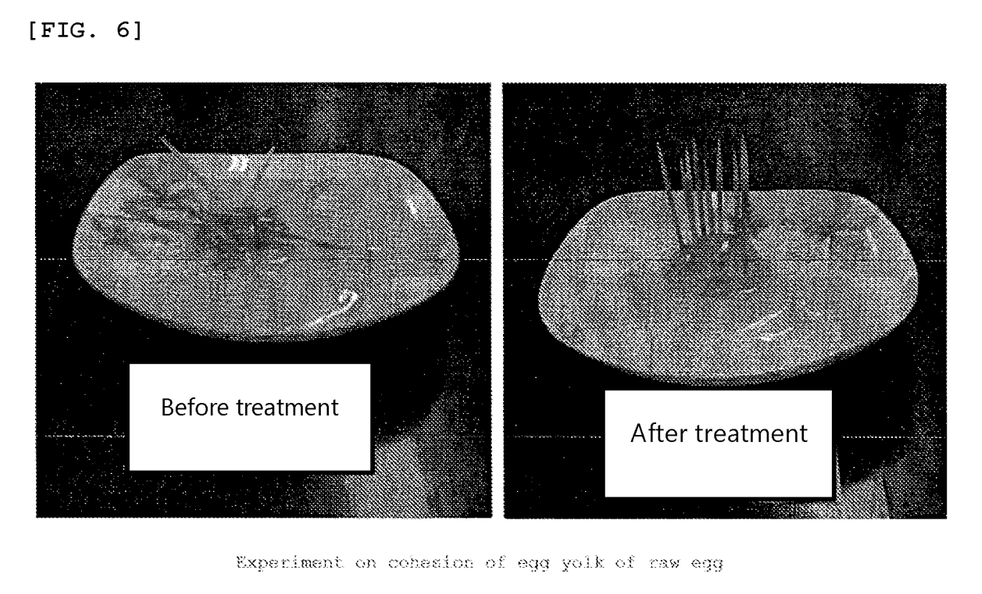

FIG. 6 illustrates the state of the cohesion of the egg yolk of a raw egg having received energy through an energy wave delivery unit 4 of a device for preservability enhancement based on cellular water activation 100. In the case of the raw egg in FIG. 6, the generation of saturated fatty acids is suppressed, and the energy is continuously activated such that the cohesion is maintained.

Figure 7:
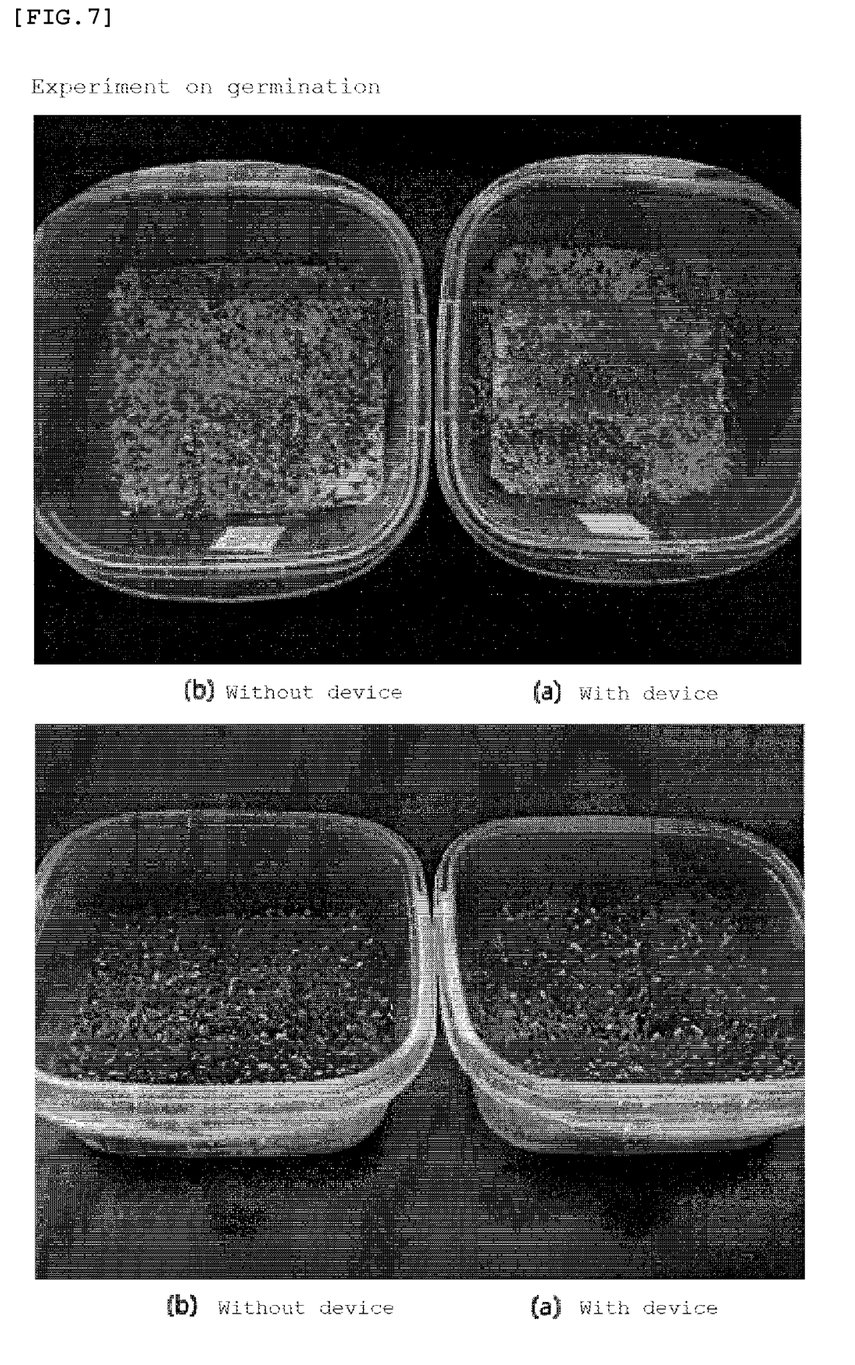

FIG. 7(*a*) illustrates germination through the processing of a device for preservability enhancement based on cellular water activation 100 while FIG. 7(*b*) illustrates germination without the processing of a device for preservability enhancement based on cellular water activation 100. The germination in FIG. 7(*a*) is greater than in FIG. 7(*b*).

Figure 8:
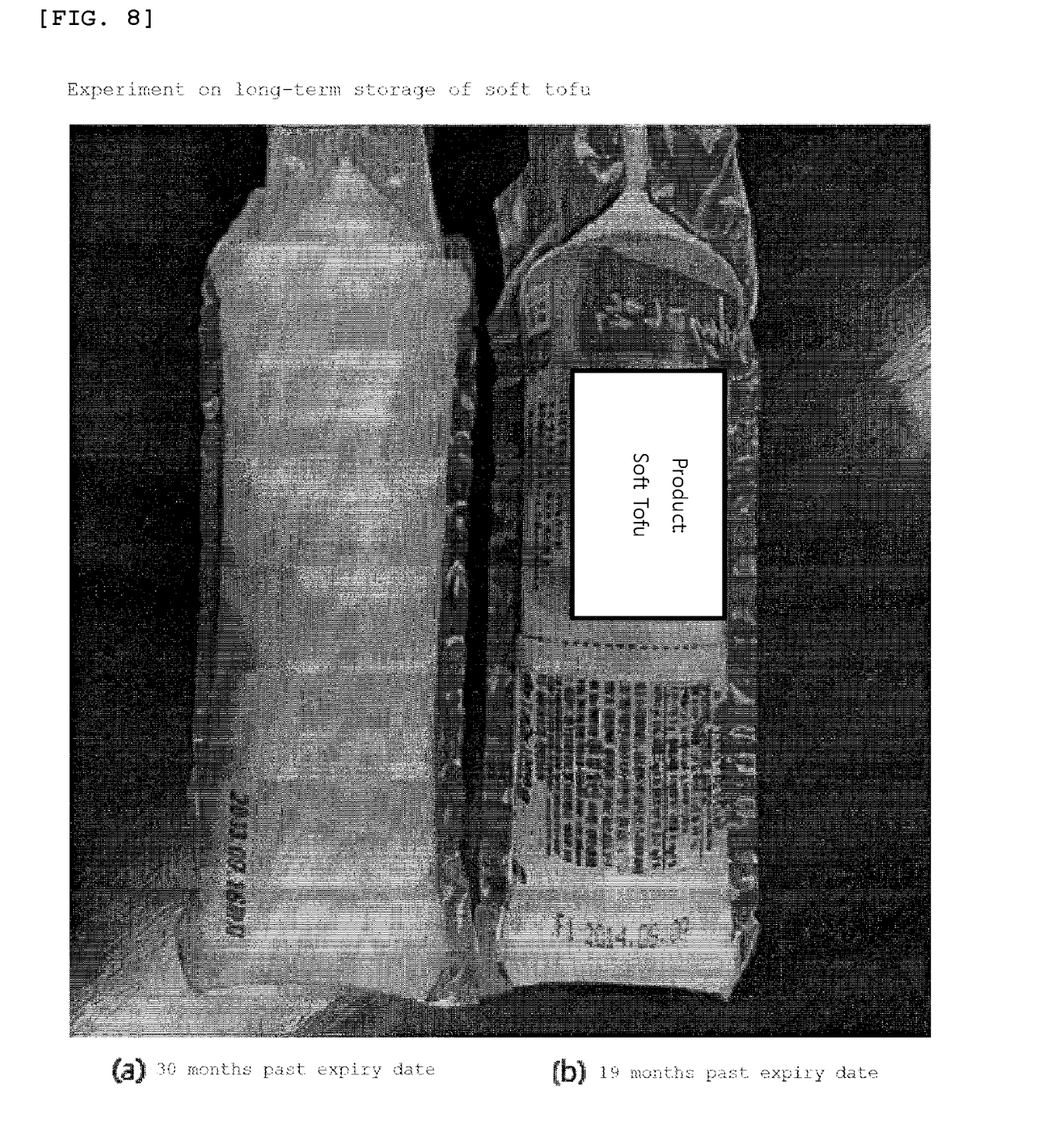
FIGS. 8 to 10 additionally illustrate the effects of long-term food storage of the device for preservability enhancement based on cellular water activation 100 in FIG. 1.
Figure 9:
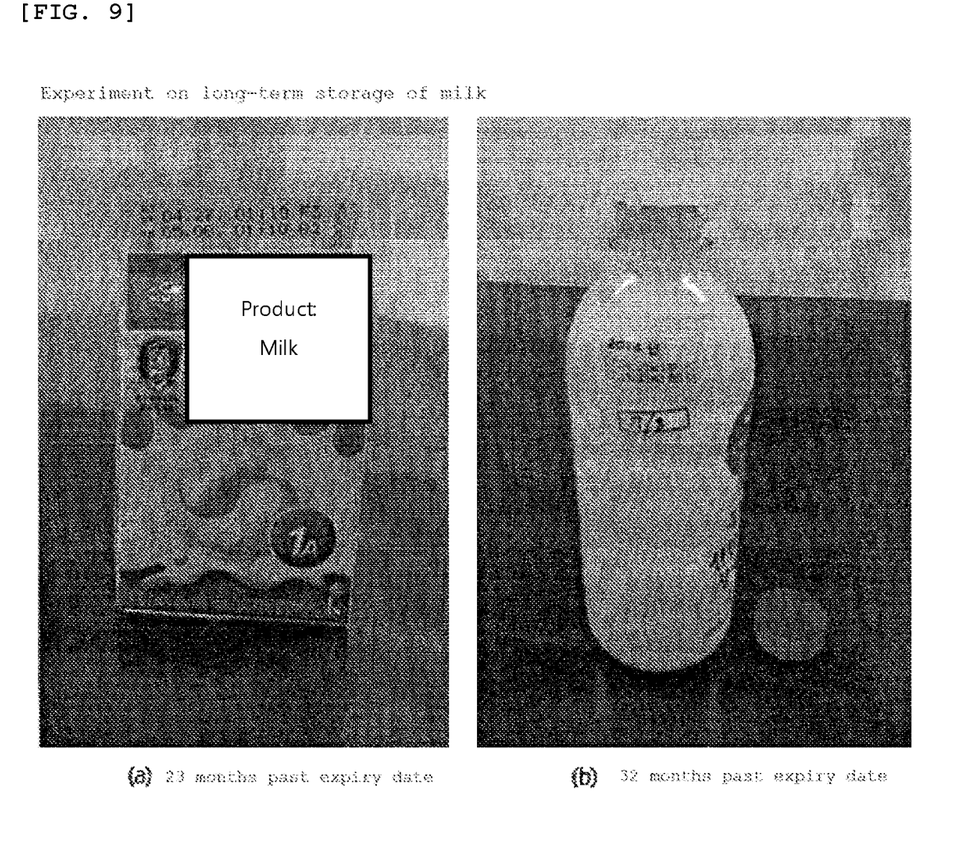
Figure 10:
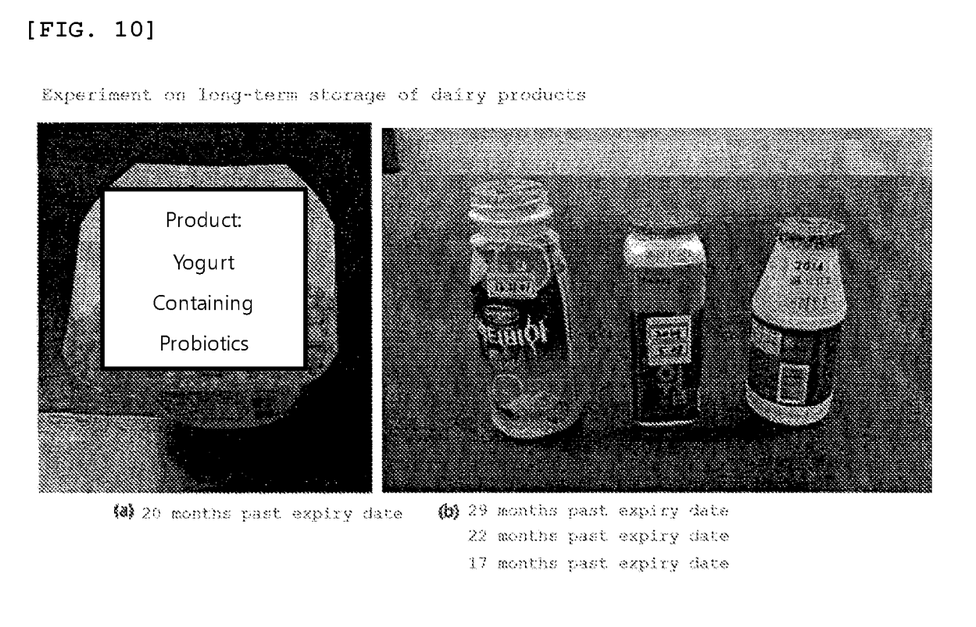

Meanwhile, FIGS. 8, 9 and 10 illustrate the state where food in a storage device, having received a complex energy wave through an energy delivery unit 4 in a device for preservability enhancement based on cellular water activation 100, is stored for a long period of time. Through FIGS. 8, 9 and 10, it can be seen that the state of the food that is a few dozen months past its expiry date remains the same with the naked eye.

Figure 11:
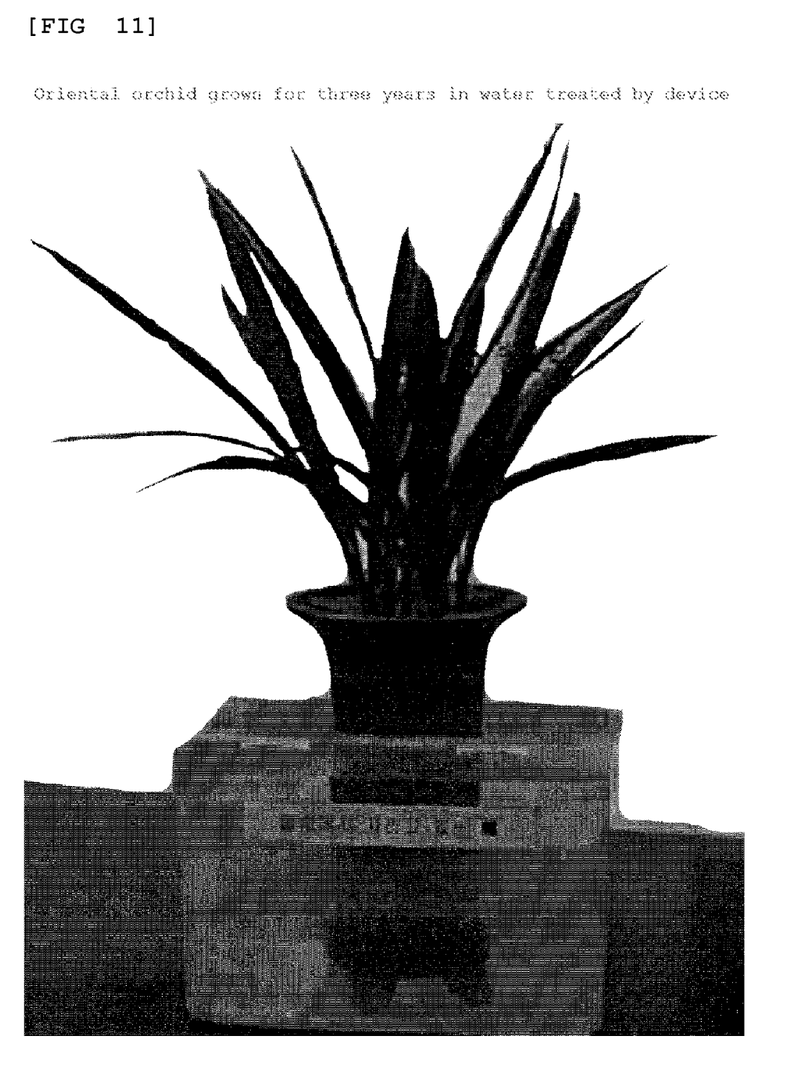
FIGS. 11 to 14 additionally illustrate the effect of plant cultivation of the device for preservability enhancement based on cellular water activation 100 in FIG. 1.

FIG. 11 illustrates the state where an oriental orchid that is an aerobic plant has grown for a few years in treated water having received a complex energy wave through an energy wave delivery unit 4 in a device for preservability enhancement based on cellular water activation 100.

Figure 12:
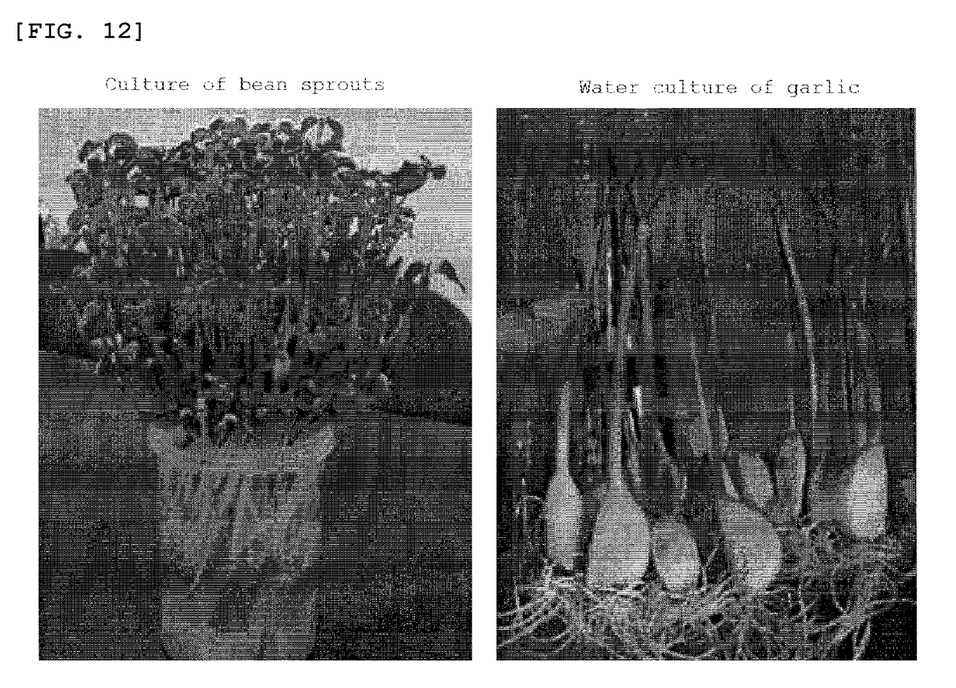
Figure 13:
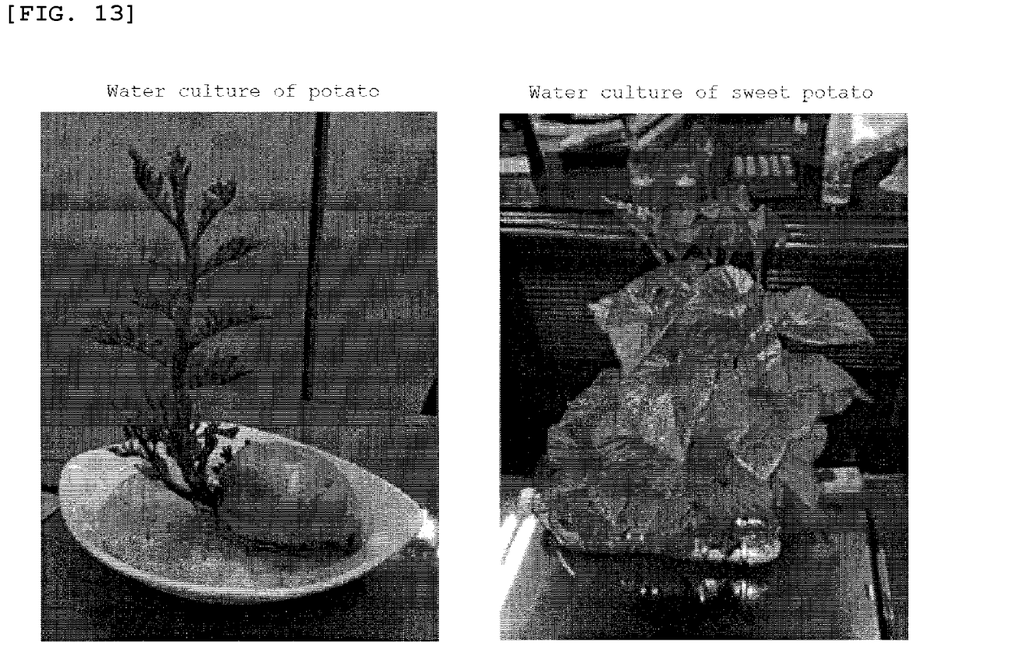

FIGS. 12 and 13 illustrates the state of the water culture of bean sprouts, garlic, a potato and a sweet potato in treated water having received energy through an energy wave delivery unit 4 in a device for preservability enhancement based on cellular water activation 100.

Figure 14:
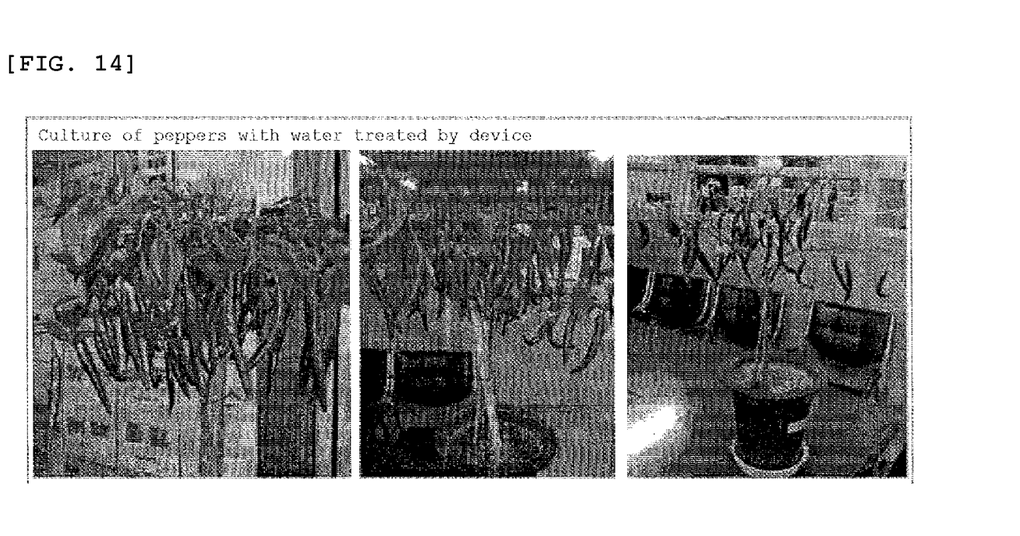

FIG. 14 illustrates the state of the water culture of peppers supplied with treated water having received a complex energy wave through an energy wave delivery unit 4 in a device for preservability enhancement based on cellular water activation 100. Through FIG. 14, it can be seen that the peppers have grown strongly until harvest time with the naked eye.

The preferred embodiments of the present invention have been illustrated in the drawings and described in this specification, and specific terms have been set forth herein to describe the present invention. However, it should be understood that they are used in the usual way to readily describe the technical contents of the present invention and to provide a better understanding of the present invention. Further, it should be understood that they are not intended to limit the scope of the present invention. It will become apparent to one skilled in the art to which the present invention pertains that the present invention can be modified in different forms without departing from the technical spirit of the present invention in addition to the embodiments described herein.

DESCRIPTION OF THE SYMBOLS

1*a*: 220 V Power input unit
1*b*: 220 V Power output unit
2: Noise filter
3: AC/DC converter
4: Complex energy wave delivery unit
100: Device for preservability enhancement based on cellular water activation
110: Primary energy wave generation unit
120: Tertiary complex wave generation and amplification unit
121: A low frequency wave generation unit
122: B low frequency wave generation unit
123: C low frequency wave generation unit
124: Low frequency pairing mixing unit
125: Complex wave amplification unit
126: BNC connector
127: Secondary energy wave induction unit
128: Energy wave generation detection unit
129: Display
130: Secondary energy wave generation unit

The invention claimed is:

1. A device for preservability enhancement based on cellular water activation comprising: a primary energy wave generation unit (110) and a tertiary complex wave generation and amplification unit (120), wherein the primary energy wave generation unit generates, by receiving AC 220 V power from a 220 V power input unit via a noise filter, generates an electromagnetic field through an electric coil therein, generates a preconfigured frequency (first cell-activating signal) in which a generated electric field and electromagnetic field energy are included, and generates free electrons caused by the flow of an electric current therein resulting from the electromagnetic field, wherein the primary energy wave generation unit includes a rare earth element that is a solid and the primary energy wave generation unit generates the generated electric field from the rare earth element; and the tertiary complex wave generation and amplification unit receives, via an output terminal of the primary energy wave generation unit, free electrons and an electromagnetic field having information on the primary energy wave generation unit and generated by the primary energy wave generation unit, and combines, amplifies and emits the first cell-activating energy wave by using the received free electrons and electromagnetic field, wherein the tertiary complex wave generation and amplification unit delivers a first cell-activating signal wave received from the primary energy wave generation unit to an A low frequency wave generation unit, a B low frequency wave generation unit, and a C low frequency wave generation unit, respectively.

2. The device according to claim 1, wherein when the tertiary complex wave generation and amplification unit receives the flow of free electrons from the primary energy wave generation unit, the tertiary complex wave generation and amplification unit receives DC 12 V power according to the conversion of AC 220 V power output by a 220 V power output unit into DC 12 V by an AC-DC converter.

3. The device according to claim 1, wherein the A low frequency wave generation unit generates an A low frequency wave ranging from 1.5 to 4.0 Hz among specific A to C low frequency waves.

4. The device according to claim 3, wherein the B low frequency wave generation unit generates a B low frequency wave ranging from 6.5 to 9 Hz among specific A to C low frequency waves by using the first cell-activating energy wave, and the C low frequency wave generation unit generates a C low frequency wave ranging from 500 to 560 Hz among specific A to C low frequency waves by using the first cell-activating energy wave.

* * * * *